April 16, 1946.  T. O. OJUTKANGAS  2,398,716

CLUTCHING MECHANISM

Filed Sept. 23, 1944  2 Sheets-Sheet 1

INVENTOR.
TAUNO O. OJUTKANGAS,
BY
ATTORNEY.

April 16, 1946.   T. O. OJUTKANGAS   2,398,716
CLUTCHING MECHANISM
Filed Sept. 23, 1944   2 Sheets-Sheet 2

INVENTOR.
TAUNO O. OJUTKANGAS,
BY
ATTORNEY.

Patented Apr. 16, 1946

2,398,716

UNITED STATES PATENT OFFICE 2,398,716

CLUTCHING MECHANISM

Tauno O. Ojutkangas, Los Angeles, Calif.

Application September 23, 1944, Serial No. 555,431

1 Claim. (Cl. 192—96)

This invention has to do generally with improvements in power transmission mechanisms, and more particularly with mechanisms for selectively clutching a shaft to pulleys carried by the shaft.

My primary object is to provide a clutching mechanism characterized by its novel compactness and mechanical adaptability to various power-transmitting situations, particularly where it is desired to rotate a driven shaft, by way of multiple pulleys, at different speeds in accordance with the nature of the work to be performed by the power of the driven shaft.

In accordance with the invention, I employ a work-driving tubular shaft carrying a pair of pulleys rotatable relative to the shaft and adapted to be clutched thereto by a suitable clutch part carried on the shaft and movable axially into engagement with the pulleys by a control rod extending within the shaft. Particularly contemplated is an arrangement of the pulleys in closely spaced relation with the clutch accommodated within end recesses of the pulleys.

A further feature and object of the invention is the provision of a clutch actuating and control mechanism associated with an end portion of the shaft and operable to shift the rod in opposite directions to selectively engage the clutch with either pulley. An important aspect of the clutch actuating assembly is the provision of a mechanism acting both to reciprocally shift the rod and clutch and to automatically retain the rod in its clutching positions.

Numerous specific features and objects in connection with the clutch actuating and control mechanism, might preliminarily be recited at length. All these however will be understood and explained to better advantage in the following detailed description of a typical and preferred embodiment of the invention shown in the accompanying drawings, and in which.

Figure 1:
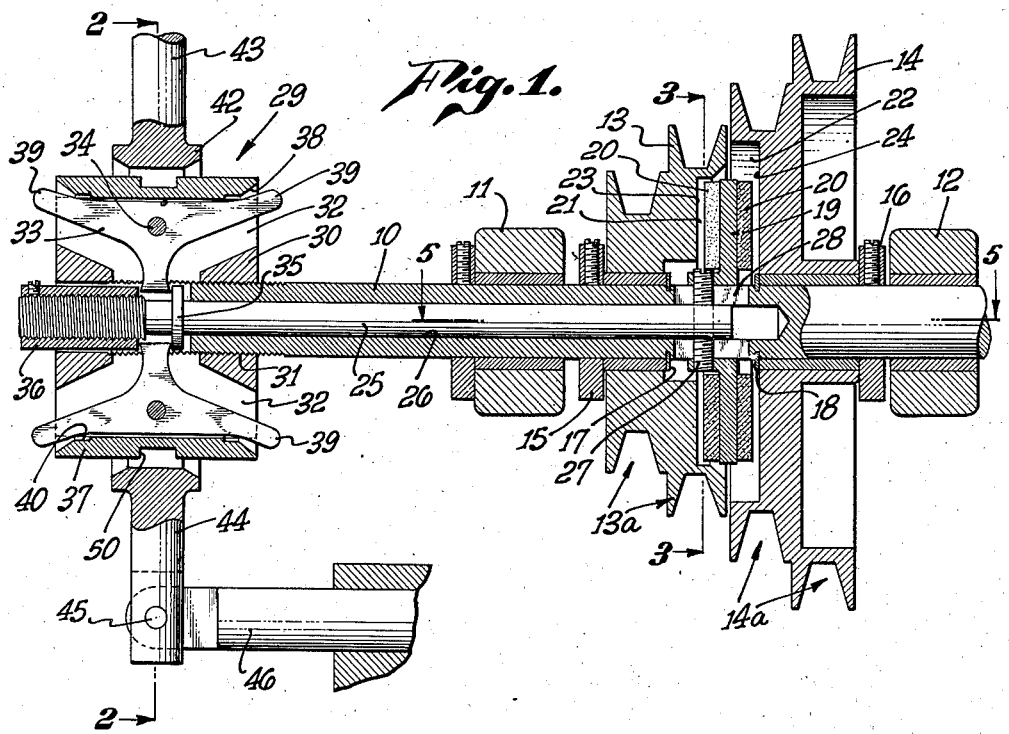
Fig. 1 is a sectional view of the mechanism with the clutch and its control in released position.

Referring first to Fig. 1, the mechanism comprises a shaft 10 which may be tubular to the extent shown, or throughout its length, rotatable in the conventionally illustrated bearings 11 and 12. The shaft carries a pair of relatively rotatable pulleys 13 and 14 which may be maintained in the illustrated closely spaced relation between set rings 15 and 16, and rings 17 and 18 seated within annular recesses in the shaft 10. As will be understood, the pulleys 13 and 14 normally are free-running on the shaft and are adapted to be belt driven by another pair of pulleys carried on a drive shaft (not shown). The purpose of the clutch mechanism described below, is to permit selective transmission of the drive from one or the other of the pulleys 13 and 14, at different speeds depending upon the effective pulley section 13a or 14a in use.

The clutching mechanism comprises a clutch disc 19, the opposite faces of which carry layers of suitable friction material 20, all received within the end recesses 21 and 22 of the pulleys, the clutch being reciprocally movable on the shaft 10 so as to be selectively engageable with the pulley surfaces 23 and 24. The clutch 19 is operated by a rod 25 extending within the shaft bore 26 and connected by pin 27 with the clutch hub. Pin 27 extends through longitudinal slots 28 in the shaft 10 so that through the pin 27 the clutch rotates with the shaft while capable of movement longitudinally thereof.

The clutch actuating and control mechanism, generally indicated at 29, comprises a cylindrical surface body 30 threaded at 31 on the end portion of the shaft and containing within radial slots 32 a pair of dogs 33 pivotally mounted on pins 34. The inner portions of the dogs 33 are received between the rod flange 35 and the end of sleeve 36 threaded on the end of the rod, the sleeve being adjustable to vary its end spacing from the flange 35 and therefore the effective clutch shifting action of the dogs. Flange 35 may be formed as an integral part of the rod, or as a projection adjustable longitudinally thereof.

Figure 4:
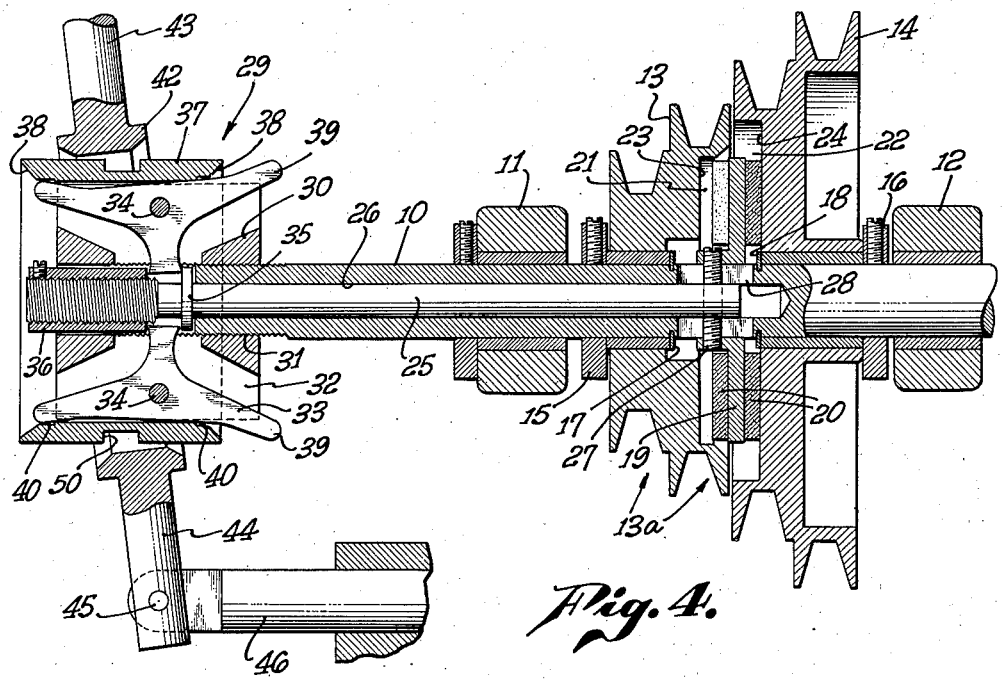
Fig. 4 is a view similar to Fig. 1 showing the parts in changed positions.
Figure 5:
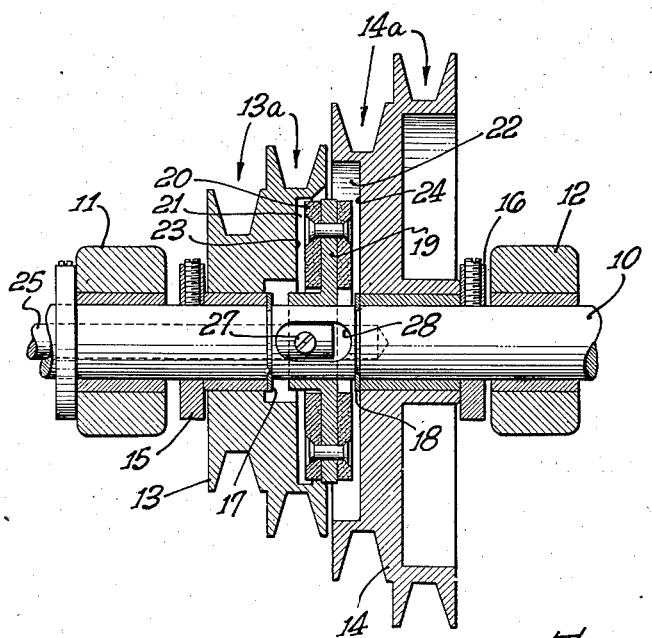
Fig. 5 is a fragmentary cross-section on line 5—5 of Fig. 1.

The body 30 is surrounded by sleeve 37 movable axially of the body to swing the dogs 33 by engagement of the baffled ends 38 of the sleeve with the outwardly projecting arms 39 of the dogs. Thus upon movement of the sleeve 37 to the left, see Fig. 4, the dogs 33 are thrust against flange 35 to shift the rod 25 in a direction bringing the clutch into engagement with the surface 24 of pulley 14. Upon movement of the sleeve 37 to the right from the position of Fig. 1, the dogs engage the end of sleeve 36 to bring the clutch against the face 23 of pulley 13. As will be understood, the entire assembly including the body 30, dogs 33 and the sleeve 37 rotate together with the shaft 10. Referring to Fig. 4, it will be observed that in the clutch engaging position of the sleeve 37, the ends of the dog arms 39 are received within an annular recess 40, thereby confining the dogs against clutch-releasing movement until the sleeve 37 is manually and intentionally returned to its neutral position.

Figure 2:
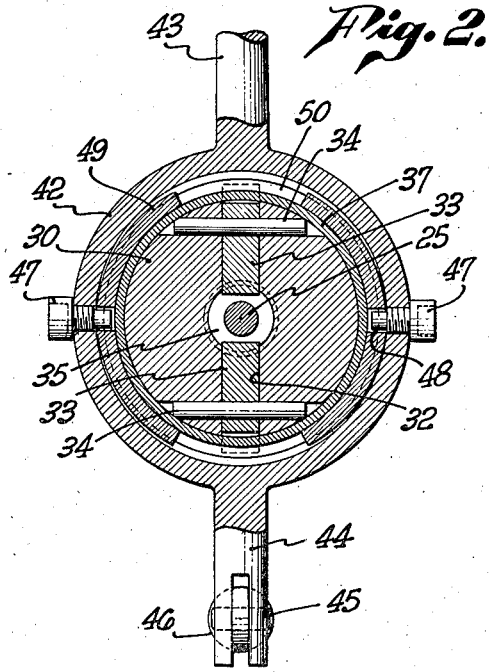
Fig. 2 is a cross-section on line 2—2 of Fig. 1.
Figure 3:
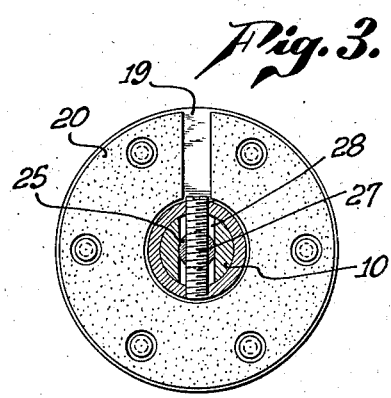
Fig. 3 is a sectional view, taken on line 3—3 of Fig. 1, showing the clutch and its association with the pulley shaft and clutch actuating rod.

The sleeve 37 may be actuated and controlled in its reciprocating movement relative to the body 30, by any suitable mechanism. Preferably, I employ a yoke consisting of an annulus 42 surrounding the sleeve and having an integral handle 43 and a bottom extension 44 pivotally attached at 45 to a stationary support 46. The annulus 42 carries a pair of set screws 47, see Fig. 2, projecting within openings 48 in a pair of ring segments 49 which are received within an annular recess 50 in the surface of the sleeve. The yoke and ring segment assembly thus may be swung reciprocally about the pivotal mounting 45 to shift the sleeve 37, while permitting rotation of the sleeve and body assembly within the yoke.

From the foregoing it will appear that the invention is characterized by its compactness and the utilized multiple pulley and clutch assembly, and further by the capacity of the actuating mechanism 29 for simple and positive control of the clutch position.

It will be understood that the end of the shaft may have any suitable connection, not shown, with the work to be driven controllably at selective different speeds in accordance with the speed transmission to the shaft from a selected pulley section by way of the described clutch mechanism.

I claim:

Mechanism of the character described, comprising a rotatable tubular shaft, a body connected to the shaft and rotatable therewith, a pair of pulleys rotatable on said shaft, a clutch movable longitudinally on the shaft between said pulleys, a rod connected to said clutch and movable longitudinally inside said shaft and body, means forming on said rod a pair of spaced shoulders one of which is adjustable longitudinally of the rod, a dog pivotally movable within said body and engageable with said shoulders to shift the rod to selectively engage the clutch with either of the pulleys, said dog having extensions projecting radially beyond said body, a sleeve surrounding and rotatable with the body and movable axially thereof to actuate said dog by engagement with said extensions thereof, said sleeve having annular recesses within which said extensions are received to prevent rod-releasing movement of the dog when the clutch is engaged with either of the pulleys, and a pivotally mounted yoke connected to said sleeve and operable to shift the sleeve in its said axial movement.

TAUNO O. OJUTKANGAS.